US009858261B2

(12) United States Patent
Fan et al.

(10) Patent No.: US 9,858,261 B2
(45) Date of Patent: Jan. 2, 2018

(54) RELATION EXTRACTION USING MANIFOLD MODELS

(71) Applicant: International Business Machines Corporation, Armonk, NY (US)

(72) Inventors: James J. Fan, Mountain Lakes, NJ (US); Chang Wang, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 201 days.

(21) Appl. No.: 14/311,695

(22) Filed: Jun. 23, 2014

(65) Prior Publication Data
US 2015/0370782 A1   Dec. 24, 2015

(51) Int. Cl.
*G06F 17/27* (2006.01)
*G06F 17/30* (2006.01)

(52) U.S. Cl.
CPC ........ *G06F 17/2785* (2013.01); *G06F 17/271* (2013.01); *G06F 17/30731* (2013.01); *G06F 17/278* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775; G06F 17/2795

USPC .................................................. 704/1, 9, 10
See application file for complete search history.

(56) References Cited

U.S. PATENT DOCUMENTS

| | | | |
|---|---|---|---|
| 9,355,359 B2* | 5/2016 | Welinder | |
| 2005/0234955 A1* | 10/2005 | Zeng | G06F 17/3071 |
| 2010/0145961 A1* | 6/2010 | Hu | G06F 17/3071 707/758 |
| 2011/0270604 A1* | 11/2011 | Qi | G06F 17/271 704/9 |

(Continued)

OTHER PUBLICATIONS

Chen et al., Relation Extraction Using Label Propagation Based Semi-Supervised Learning, 2006, ACL, Proceedings of the 21st International Conference on Computational Linguistics and the 44th annual meeting of the Association for Computational Linguistics}, pp. 129-136.*

(Continued)

*Primary Examiner* — Lamont Spooner
(74) *Attorney, Agent, or Firm* — Cantor Colburn LLP; William Stock

(57) ABSTRACT

According to an aspect, relation extraction using manifold models includes identifying semantic relations to be modeled in a selected domain. Data is collected from at least one unstructured data source based on the identified semantic relations. Labeled and unlabeled data that were both generated from the collected data is received. The labeled data includes indicators of validity of the identified semantic relations in the labeled data. Training data that includes both the labeled and unlabeled data is created. A manifold model is trained based on the training data. The manifold model is applied to new data, and a semantic relation is extracted from the new data based on the applying.

20 Claims, 6 Drawing Sheets

(56) References Cited

U.S. PATENT DOCUMENTS

| | | | | |
|---|---|---|---|---|
| 2012/0109964 A1* | 5/2012 | Jiang | ............... | G06F 17/30038 707/739 |
| 2012/0290288 A1* | 11/2012 | Ait-Mokhtar | ......... | G06F 17/271 704/9 |
| 2013/0246046 A1* | 9/2013 | Fan | ................ | G06F 17/2785 704/9 |
| 2014/0156264 A1* | 6/2014 | Etzioni | ............... | G06F 17/2705 704/9 |
| 2014/0372439 A1* | 12/2014 | Lu | ................ | G06F 17/30256 707/737 |

OTHER PUBLICATIONS

Bundschus et al., Digging for Knowledge with Information Extraction: A Case Study on Human Gene-Disease Associations, 2010, Proceedings of the 19th ACM international conference on Information and knowledge management}, pp. 1845-1848.*

Surdeanu et al., Multi-instance Multi-Learning for Relation Extraction, 2012,ACL, Proceedings of the 2012 Joint Conference on Empirical Methods in Natural Language Processing and Computational Natural Language Learning}, pp. 455-465.*

Belkin et al. (Manifold Regularization: A Geometric Framework for Learning from Labeled and Unlabeled Examples), 2006, JMLR. org,, The Journal of Machine Learning Research, vol. 7, pp. 2399-2434.*

Liu et al., Learning semantic visual vocabularies using diffusion distance, 2009, IEEE, Computer Vision and Pattern Recognition, 2009. CVPR 2009. IEEE Conference, pp. 461-468.*

Wang et al., A novel clustering algorithm for Unsupervised Relation Extraction, 2012, IEEE, Digital Information Management (ICDIM), 2012 Seventh International Conference on}, pp. 16-21.*

Bollegala et al., Relational duality: Unsupervised extraction of semantic relations between entities on the web, 2010, ACM, Proceedings of the 19th international conference on World wide web}, pp. 151-160.*

Zhao et al., Zhao, Representative Sampling for Text Classification Using Support Vector Machines, 2003, European Conference on Information Retrieval, Springer, pp. 393-407.*

Wang et al., Relation extraction and scoring in DeepQA, 2012, IEEE, pp. 9:1-9:12.*

Huh et al., Discriminative Topic Modeling Based on Manifold Learning, 2012, ACM TKDD, vol. 5 Issue 4, Article No. 20, pp. 20:1-20:25.*

Doddington et al. The Automatic Content Extraction (ACE) Program-TAsks, Data, and Evaluation, 2004, pp. 1-4.*

GuoDong et al., Label propogation via bootstrapped support vectors for semantic relation extration between named entities, Computer Speech and Language 23 (2009), pp. 464-478.*

The automatic content extraction projects, http://projects.ldc.upenn.edu/ace/; 2004; 2 pages.

Aronson, "Effective mapping of biomedical text to the UMLS metathesaurus: The MetaMap program," In Proceedings of the 2001 Annual Symposium of the American Medical Informatics Association, 2001, 5 pages.

Belkin et al., "Manifold Regularization: A Geometric Framework for Learing from Labeled and Unlabeled Examples," Journal of Machine Learing Research, 2006; pp. 2399-2434.

Bunescu et al., "A Shortest Path Dependency Kernel for Relation Extraction," Proceedings of the Conference on Human Language Technology and Empirical Methods in Natural Language Processing; 2005; 8 pages.

Chan et al., "Exploiting Background Knowledge for Relation Extraction," Proceedings of the 23rd International Conference on Computational Linguistics, 2010, pp. 152-160.

Collins et al., "Convolution Kernels for Natural Language," Proceedings of the Advances in Neural Infomation Processing Systems (NIPS) , 2001, pp. 625-632.

Culotta et al., "Dependency Tree Kernels for Relation Extraction," Proceedings of the 42 annual Meeting of the Association for Computational Linguistics (ACL), 2004, pp. 423-429.

Deerwester et al. "Indexing by Latent Semantic Analysis," Journal of the American Society for Information Science, Sep. 1990, pp. 391-407.

Demner-Fushman et al., "Answering Clinical Questions with Knowledge-Based and Statistical Techniques," Journal of Computational Linguistics, 2007, vol. 33, No. 1, pp. 63-103.

Hoffmann et al., "Knowledge-Based Weak Supervision for Information Extraction of Overlapping Relations," Proceedings of the Annual Meeting of the Association of Computational Linguistics (ACL), 2011, 10 pages.

Ji et al., "Overview of the TAC2011 Knowledge Base Population Track," Proceedings of the Text Analytics Conference, 2011, 33 pages.

Jing Jiang, "Multi-Task Transfer Learning for Weakly Supervised Relation Extraction," Proceedings of the Joint Conference of the 47th Annual Meeting of the Association for Computational Linguistics (ACL) and the 4th International Joint Conference on Natural Language Processing (IJCNLP) , 2009, pp. 1012-1020.

Kambhatla, "Combining Lexical, Syntactic, and Semantic Features with Maximum Entropy Models for Extracting Relations," In Proceedings of the ACL 2004 on Interactive poster and demonstration sessions, 2004, 4 pages.

Lindberg et al., "The Unified Medical Language System," Journal of the American Medical Informatics Association, vol. 5, No. 1, 1998, 11 pages.

McCord et al., "Deep parsing in Watson," IBM Journal of Research and Development, 2012, 15 pages.

Miller et al., "A Novel Use of Statistical Parsing to Extract Information from Text," Proceedings of the 1st North American Chapter of the Association for Computational Linguistics Conference, 2000, 8 pages.

Min et al., "Distant Supervision for Relation Extraction with an Incomplete Knowledge Base," 2013 Conference of the North American Chapter of the Association for Computational Linguistics Human Language Technologies (NAACL-HLT), 2013, 6 pages.

Mintz et al. "Distant supervision for relation extracton without labeled data," Proceedings of the Joint Confernece of the 47th Annual Meeting of the Association for Computational Linguistics (ACL) and the 4th International Joint Conference on Natural Language Processing (IJCNLP), 2009, pp. 1003-1011.

Ngugen et al., "Convolution Kernels on Constituent, Dependency and Sequential Structures for Relation Extraction," Proceedings of the 2009 Conference on Empirical Methods in Natural Language Processing (EMNLP), 2009, 10 pages.

Riedel et al., "Modeling Relations and Their Mentions without Labeled Text," Proceedings of the European Conference on Machine Learning and Knowledge Discovery in Databases (ECML PKDD), 2010, 16 pages.

Rindflesch et al., "The interaction of domain knowledge and linguistic structure in natural language processing: interpreting hypernymic propositions in biomedical text," Journal of Biomedical Informatic, 2003, pp. 462-477.

Singh et al. "Unbabeled data: Now it helps, now it doesn't," Proceedings of the Advances in Neual Information Processing Systems (NIPS), 2008, 8 pages.

Surdeanu et al., "Multi-instance Multi-label Learning for Relation Extraction," Proceedings of the 2012 Conference on Empirical Methods in Natural Language Processing and Natural Language Learning (EMNLP), 2012, 11 pages.

Takamatsu et al., "Reducing Wrong Labels in Distant Supervision for Relation Extraction," In Proceedings of the Annual Meeting of the Association for Computational Linguistics (ACL), 2012, 9 pages.

Uzuner et al., "2010 i2b2/VA challenge on concepts, assertions, and relations in clinical text," Journal of American Medical Informatics Association, 2011, 6 pages.

Wang et al., "Relation extraction and scoring in DeepQA," IBM Journal of Research and Development, 2012, 12 pages.

(56) References Cited

OTHER PUBLICATIONS

Wang et al., "Relation extraction with relation topcs," Proceedings of the 2011 Conference on Empirical Methods in Natural Language Processing (EMNLP), 2011, 11 pages.
Zhang et al., "A Composite Kernel to Extract Relations between Entities with both Flat and Structured Features," In Proceedings of the 21st International Conference on Computational Linguistics and 44th Anual Meeting of the Asscociation for Computational Linguistics (ACL), 2006, 8 pages.
Zhao et al., "Extracting Relations with Integrated Information Using Kernel Methods," Proceedings of the 43rd Annual Meeting of the Association for Computational Linguistics (ACL), 2005, pp. 449-426.
Bernhard Scholkopf et al., "Learning with Kernels: Support Vector Machines, Regularization Optimization and Beyond," MIT Press, 2002, 626 pages.

\* cited by examiner

US 9,858,261 B2

RELATION EXTRACTION USING MANIFOLD MODELS

BACKGROUND

The present disclosure relates generally to relation extraction, and more specifically, to relation extraction using manifold models.

Much of human communication, whether it is in natural-language text, speech, or images, is unstructured. The semantics necessary to interpret unstructured information to solve problems is often implicit and must be derived by using background information and inference. Unstructured data is contrasted with structured data, such as data in traditional database tables, where the data is well-defined, and the semantics are explicit. When structured data is used, queries are prepared to answer predetermined questions on the basis of necessary and sufficient knowledge of the meaning of the table headings (e.g., Name, Address, Item, Price, and Date). This is not the case with unstructured information where the semantics are not always explicit and it is often difficult to determine what an arbitrary string of text or an image really means.

With the enormous proliferation of electronic content on the web and within enterprises, unstructured information (e.g., text, images, and speech) is growing far faster than structured information. Whether it is general reference material, textbooks, journals, technical manuals, biographies, or blogs, this content contains high-value knowledge that is often important for informed decision making. The ability to leverage the knowledge latent in these large volumes of unstructured text lies in deeper natural-language analysis that can more directly infer answers to user questions.

Natural-language processing (NLP) techniques, which are also referred to as text analytics, infer the meaning of terms and phrases by analyzing their syntax, context, and usage patterns. Human language, however, is so complex, variable (there are many different ways to express the same meaning), and polysemous (the same word or phrase may mean many things in different contexts) that this presents an enormous technical challenge. Decades of research have led to many specialized techniques each operating on language at different levels and on different isolated aspects of the language understanding task. These techniques include, for example, shallow parsing, deep parsing, information extraction, word-sense disambiguation, latent semantic analysis, textual entailment, and co-reference resolution. None of these techniques is perfect or complete in their ability to decipher the intended meaning. Unlike programming languages, human languages are not formal mathematical constructs. Given the highly contextual and implicit nature of language, humans themselves often disagree about the intended meaning of any given expression.

Detecting semantic relations in text is very useful in both information retrieval and question answering because it enables knowledge bases (KBs) to be leveraged to score passages and retrieve candidate answers. Approaches for extracting semantic relations from text include rule-based methods that employ a number of linguistic rules to capture relation patterns. In addition, feature based methods that transform relation instances into a large amount of linguistic features like lexical, syntactic and semantic features, and that capture the similarity between these feature vectors can used. Approaches also include those that are kernel-based and focused on using tree kernels to learn parse tree structure related features.

SUMMARY

Embodiments include a method, system, and computer program product for relation extraction using manifold models. A method includes identifying semantic relations to be modeled in a selected domain. Data is collected from at least one unstructured data source based on the identified semantic relations. Labeled and unlabeled data that were both generated from the collected data is received. The labeled data includes indicators of validity of the identified semantic relations in the labeled data. Training data that includes both the labeled and unlabeled data is created. A manifold model is trained based on the training data. The manifold model is applied to new data, and a semantic relation is extracted from the new data based on the applying.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
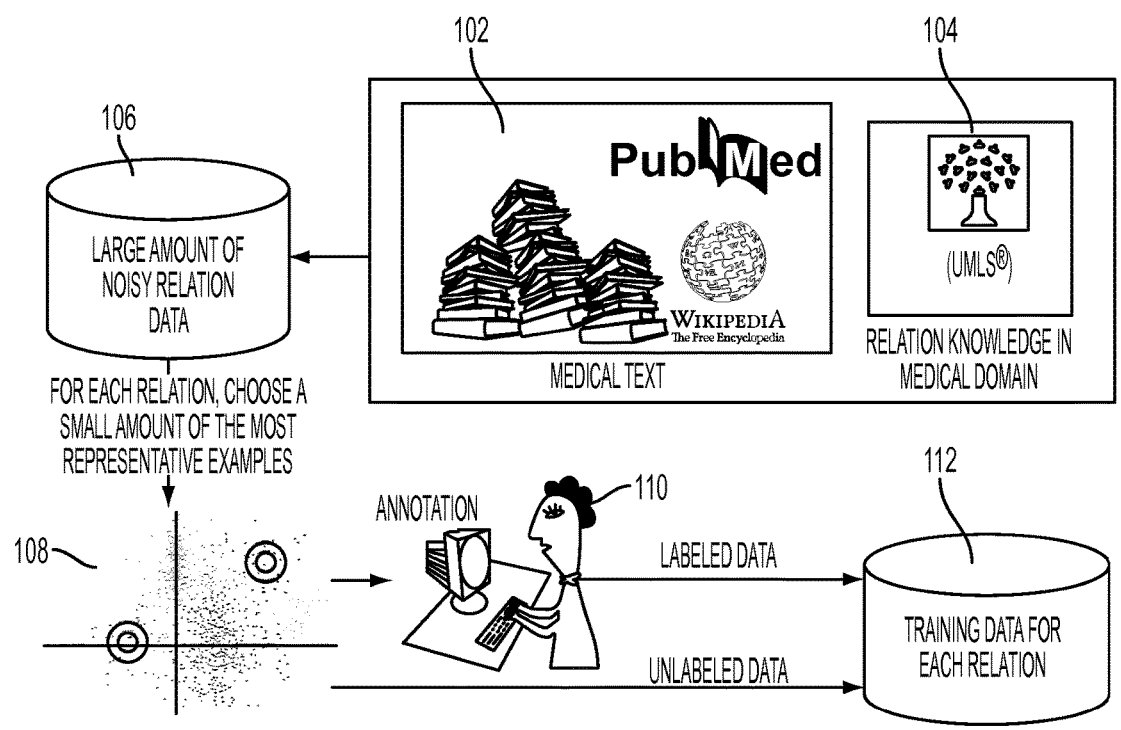
FIG. 1 depicts a block diagram of a system for collecting training data in the medical domain in accordance with an embodiment.

Embodiments disclosed herein relate to the use of manifold models to extract semantic relations from unstructured text with a reduction in the amount of annotation typically required by contemporary methods of natural language processing (NLP). As used herein, the term "semantic relations" refers to relationships between concepts or meanings. A training data gathering phase can include extracting a sub-set of "super-relations" from a repository of relation data. The terms "super-relation" and "key relation" are used interchangeably herein to refer to a semantic relation that integrates several relations. In a medical relation database, a large number of relations are inverses of other relations or otherwise redundant, and a super-relation can be used to integrate these redundant relations.

An embodiment of the training data gathering can include obtaining example data for each of the super-relations from a corpus of answer sources. As used herein, the term "corpus" refers to a set of documents. As used herein, the terms "example data" and "collected data" are used interchangeably to refer to the data that may express the desired relation. As used herein, the term "training data" is collected data that has been selected to train a statistical relation detection model. In embodiments, all or a subset of the example data becomes training data. In many cases the training data gathering can result in a relatively large amount of example data and a subset of representative instances can be selected (e.g., using clustering algorithms) for manual annotation (e.g., by a human). In accordance with embodiments described herein, both the subset of the example data that was annotated with labels (which indicate whether relations are valid or invalid), and the remaining unlabeled example data are output (or stored) to be used as training data. As used herein, the term "labeled data" refers to the data where the label is known (positive or negative), and as used herein, the term "unlabeled data" refers to the data where the label is unknown.

As used herein, the term "training data" refers to the dataset used to train a statistical relation detection model. As used herein, the term "training data instance" refers to an instance in the training dataset. In an embodiment, such instance can include a relation name, a sentence, and two terms in the sentence corresponding to the relation arguments.

Embodiments can also include training a model (also referred to herein as a "classifier") based on contents of the training data. Each training data instance can be represented using common features used for relation extraction and a matrix that models a data manifold around the training data can be constructed. A label vector can be constructed from the user input and then a projection function for each relation can be computed. By using both the labeled and unlabeled training data, over fitting can be prevented or reduced.

Examples related to the medical field are described herein, however embodiments are not limited to applications in the medical field as embodiments can be utilized by any application that requires semantic relations to be extracted from text, including, but not limited to: the automotive field (e.g., to facilitate automotive repairs), and a general question-answer (QA) system.

Embodiments described herein include the use of a manifold model for medical relation extraction. The example described herein includes a model that can be built based on a very large medical corpus (e.g., 11 gigabytes of unstructured text containing about 80 million sentences) to accurately and efficiently detect the key medical relations that can facilitate clinical decision making. An embodiment can integrate domain specific parsing and typing systems, and can utilize labeled as well as unlabeled examples. To provide users with more flexibility, label weight can also be taken into consideration. In addition, embodiments disclosed herein can be used to implement a closed-form solution, which is a solution that can be expressed analytically in terms of a finite number of certain elementary functions.

There exists a vast number of knowledge sources and ontologies in the medical domain. Such information is also growing and changing extremely quickly, making the information difficult for people to read, process, and remember. The combination of recent developments in information extraction and the availability of unparalleled medical resources thus offer the opportunity to develop new techniques to help healthcare professionals overcome the cognitive challenges they may face in clinical decision making.

Several challenges are addressed by various embodiments of the medical relation extraction system disclosed herein.

The first has to do with identifying a set of relations that has sufficient coverage in the medical domain. In embodiments, these were identified by studying a real-world diagnosis related question set and identifying a set of relations that had a good coverage of clinical questions. A second challenge has to do with how to efficiently detect relations in a large amount of medical text. To extract relations from a dataset at this scale, embodiments of the relation detectors have to be relatively fast. Embodiments disclosed herein can include using parsing adaptation and replacing non-linear classifiers with linear classifiers to expedite the relation detection. A third challenge is that the labeled relation examples (e.g., the labeled training data instances) may often be insufficient due to the high labeling cost (e.g., the cost of a human annotator). In contemporary models, this often results in the use of a naïve model to detect relations, that is, models that can tend to over-fit for the labeled data. Embodiments disclosed herein address this issue by developing a training model that encourages examples (including both labeled and unlabeled examples) with similar contents to be assigned with similar scores. Embodiments of the training model disclosed herein go beyond regular regression models in that they apply constraints to the coefficients such that the topology of the given data manifold is respected. Computing the optimal weights in a regression model and preserving manifold topology are conflicting objectives, and embodiments disclosed herein provide a closed-form solution to balance these two goals by maximizing the overall gains.

Embodiments disclosed herein include a novel way of setting up the problem of relation extractions. There is a fundamental difference between the problem setup of embodiments disclosed herein and conventional setups, such as those used by Informatics for Integrating Biology and the Bedside (i2b2), a national institute of health (NIH) funded national center for biomedical computing, in the medical field. In an i2b2 relation extraction task, entity mentions are manually labeled, and each mention has one of three concepts: treatment; problem; or test. To resemble real-world medical relation extraction challenges where perfect entity mentions do not exist, embodiments disclosed herein can utilize a new setup that requires the entity mentions to be automatically detected and not limited to a small selected group of concepts. Embodiments can utilize a product such as MetaMap® from the National Library of Medicine (NLM) to detect medical entity mentions. MetaMap considers all terms as entities and automatically associates each term with a number of concepts from the Unified Medical Language System® (UMLS) concept unique identifier (CUI) dictionary that currently has more than 2.7 million distinct concepts (compared to 3 in i2b2). The huge amount of entity mentions, concepts and noisy concept assignments support relation extractions that are more flexible and more likely to reflect real-world situations.

From the perspective of relation extraction applications, embodiments disclosed herein identify super-relations (e.g., those in Table 1 below), which are those key relations that can facilitate clinical decision making. In addition, embodiments provide approaches to collect training data for these relations with a relatively small amount of labeling effort when compared contemporary approaches.

From the perspective of relation extraction methodologies, embodiments include a manifold model for relation extraction that utilizes both labeled and unlabeled data. In addition, a weight of the label can also be taken into consideration.

The medical domain has a vast amount of natural language content found in textbooks, encyclopedias, guidelines, electronic medical records, and many other sources. The amount of data is also growing at an extremely high speed. Substantial understanding of the medical domain has already been included in the UMLS knowledge base (KB), which includes medical concepts, relations, and definitions. The UMLS KB is a compendium of many controlled vocabularies in the biomedical sciences and may be viewed as a comprehensive thesaurus and ontology of biomedical concepts. It provides a mapping structure among these vocabularies and thus allows translation among the various terminology systems. UMLS further provides facilities for NLP and is intended to be used mainly by developers of systems in medical informatics. The 2012 version of the UMLS KB contains information about more than 2.7 million concepts from over 160 source vocabularies. Software applications for using UMLS KB also exist, for example Meta-Map is able to identify concepts in text, and SemRep from the NLM can be used to detect some relations using hand-crafted rules.

In the medical domain, relations that are important for clinical decision making (the super-relations) are identified based on four main clinical tasks that physicians engage in. In the example described herein, they include: therapy—select treatments to offer a patient, taking consideration of effectiveness, risk, cost and other factors (prevention is under the general category of therapy); diagnosis (including differential diagnosis based on findings and diagnostic test); etiology—identify the factors that cause the disease; and prognosis—estimate the patient's likely course over time. These activities can be translated into "search tasks". For example, the search for therapy is usually the therapy selection given a disease. Studies can be performed to identify more information about typical questions and the relations can be updated based on current information. The medical domain example described herein focuses on the seven key relations shown in Table 1.

relation can integrate multiple UMLS relations. Using the CUI pairs in the UMLS relation KB 104, each super-relation is associated with a set of CUI pairs.

The UMLS 2012 Release contains more than 600 relations and fifty million relation instances under around 15 categories. One category is a "RO" category (RO stands for "has relationship other than synonymous, narrower, or broader") that covers relations such as, but not limited to: "may_treat"; and "has_finding_site." Each relation has a certain number of CUI pairs that are known to bear that relation. As described previously, in UMLS, some relation information is redundant. Firstly, half of these relations may simply be the inverse of each other (e.g., the relation "may_treat" and "may_be_treated_by") and may be collapsed into the same relation, or super-relation. Secondly, there may be a significant amount of redundancy even among non-inverse relations (e.g., the relation "has_manifestation" and "disease_has_finding" may have the same meaning).

Referring back to FIG. 1, relation example data is collected from the medical corpus 102 for each super-relation and stored in a repository 106. To collect the training data for each super-relation, sentences that express the super-relation (including the UMLS relations) can be identified in the medical corpus 102. In an embodiment, all of the sentences in the medical corpus 102 are parsed, looking for the sentences containing the terms that are associated with the CUI pairs in the UMLS KB 104. This (distant supervision) approach can result in a very large amount of sentences that contain the desired relations, but can also bring in a lot of noise in the form of false positives. For example, it might be known from the UMLS KB 104 that "antibiotic drug" may treat "Lyme disease". However the sentence "This paper studies the relationship between an antibiotic drug and Lyme disease" contains both terms but does not express the "treats" relation.

TABLE 1

| Super-Relations | Argument 1 | Argument 2 | UMLS Relations | Noise % in Annotation Data |
|---|---|---|---|---|
| Treats | Disease | Treatments | May_treat | 16% |
| Prevents | Disease | Treatments | May_prevent | 49% |
| Contraindicates | Disease | Treatments | Contraindicated_drug | 97% |
| Diagnoses | Disease | Tests | May_diagnose | 63% |
| Causes | Disease | Causes | Cause_of Causative_agent_of | 66% |
| Location_of | Disease | Locations | Has_finding_site Disease_has_primary Anatomic_site | 41% |
| Symptom_of | Disease | Symptoms | Disease_has_finding Disease_may_have_finding Has_manifestation Has_definitional_manifestation | 66% |

FIG. 1 depicts a block diagram of a system for collecting training data in the medical domain in accordance with an embodiment. The medical corpus 102 shown in the embodiment of FIG. 1 has incorporated a set of medical books/journals, and MEDLINE® abstracts. These sources are complemented with Wikipedia articles, which are also included in the medical corpus 102 of FIG. 1.

In an embodiment, a subset of relations that are directly related to the super-relations are manually chosen from UMLS relations in the UMLS KB 104. The correspondences between the super-relations and the UMLS relations are shown in Table 1. One thing to note is that super-relations are more general than the UMLS relations, and one super- Embodiments can use MetaMap or MedicalESG to detect medical entity mentions in the corpus 102. MetaMap considers all terms as entities and automatically associates each term with a number of concepts from the UMLS CUI dictionary. Another parser that can be implemented by embodiments is MedicalESG which is an adaptation of English slot grammar (ESG) to the medical domain with extensions of medical lexicons integrated in the UMLS 2012 Release. Compared to MetaMap, MedicalESG is based on the same medical lexicons, and can produce very similar parsing results at increased processing speeds.

An embodiment utilizes the semantic types defined in UMLS to categorize argument types. UMLS currently includes a set of 133 subject categories, or semantic types, that provide a consistent categorization of more than two million concepts represented in the UMLS Metathesaurus. An embodiment of the relation extractor assigns each relation argument with one or more UMLS semantic types through a two step process. First, MedicalESG is used to process the input sentence, identify segments of text that correspond to concepts in the UMLS Metathesaurus and associate each of them with one or more UMLS CUIs. Then, a CUI lookup is performed in UMLS to find the corresponding semantic types for each CUI.

Most relation arguments are associated with multiple semantic types. For example, the term "tetracycline hydrochloride" has two types: "Organic Chemical" and "Antibiotic". Sometimes, the semantic types are noisy due to ambiguity of terms. For example, the term "Hepatitis b" is associated with both "Pharmacologic Substance" and "Disease or Syndrome" based on UMLS. The reason for this is that people use "Hepatitis b" to represent both "the disease of Hepatitis b" and "Hepatitis b vaccine", so UMLS assigns both types to it. This is a concern for relation extraction, since two types bear opposite meanings. An embodiment uses the strategy of integrating all associated types and relies on the relation detector trained with the labeled data to decide how to weight different types based upon the context.

One way to clean the candidate examples for use as training data is to have human annotators to go through each of the sentences and assign the sentences with positive or negative labels. However, this approach is often not feasible when there are millions of sentences to vet. In an embodiment, to minimize the human labeling effort, a K-medoids clustering algorithm is executed on the sentences associated with each super-relation, and the cluster centers 108 are selected as the most representative sentences for annotation 110. The number of clusters chosen can vary (e.g., from 3,000-6,000) depending on the number of sentences that were collected from the corpus 102 for each super-relation. The similarity of two sentences can be defined as the bag-of-words (BOW) similarity of the dependency paths connecting arguments. Part of the resulting data can be manually vetted by annotators, and the remaining can be held as unlabeled data for further experiments. Both the unlabeled data and the labeled data for each key relation are stored as training data in a training data repository 112.

The task of relation annotation 110 can be quite straightforward, since both arguments are given and the label indicates that the relation is valid (e.g., "yes" or "1") or invalid (e.g., "no" or "0"). An example noise rate of each super-relation (#sentences expressing the relation/#of total sentences in the corpus) is shown in Table 1 based on the annotation results. As used herein, the term "noise rate" refers to the number of false positive examples over the total number of positive examples (including both true and false positives). As shown in the example in Table 1, the noise rates can differ significantly from one relation to another.

In an embodiment, to grow the size of the negative training set for each super-relation, a small amount of the most representative examples (also coming from K-medoids clustering) from each unrelated UMLS relation can be added to the training set as negative examples. As used herein, the term "negative training set" refers to the set of examples assigned with negative labels and used in training.

Figure 2:
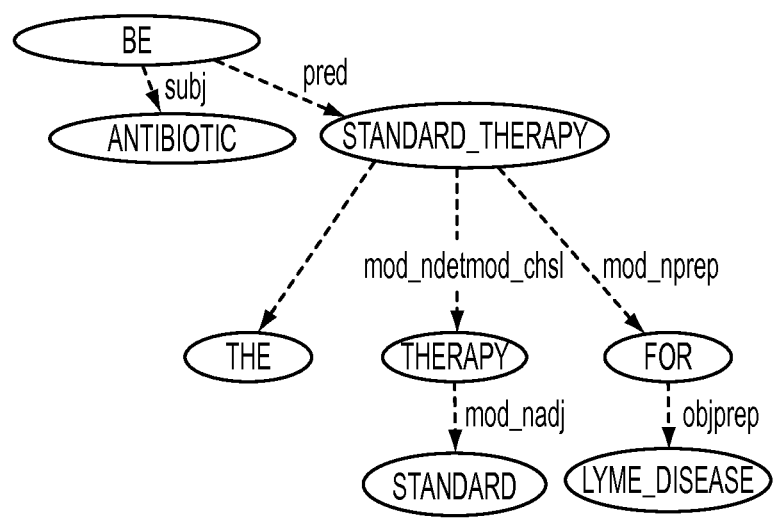
FIG. 2 depicts a parse tree in accordance with an embodiment.

Referring now to FIG. 2, an example of an embodiment of a parse tree is generally shown that considers the sentence: "Antibiotics are the standard therapy for Lyme disease." As shown in FIG. 2, MedicalESG can first generate a dependency parse tree to represent grammatical relations between the words in the sentence. MedicalESG can then associate the words with CUIs. For example, "Antibiotics" is associated with CUI "C0003232" and "Lyme disease" is associated with two CUIs: "C0024198" and "C0717360". CUI lookup will assign "Antibiotics" with a semantic type "Antibiotic", and "Lyme disease" with three semantic types: "Disease or Syndrome", "Pharmacologic Substance" and "Immunologic Factor". This sentence expresses a "treats" relation between "Antibiotics" and "Lyme disease".

Figure 3:
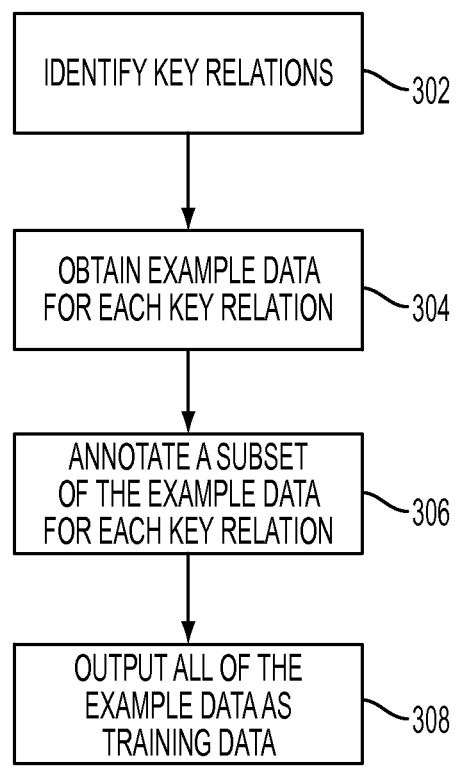
FIG. 3 depicts a process flow for collecting training data in accordance with an embodiment.

In FIG. 3, a process flow for training data collection is generally shown in accordance with an embodiment. At block 302, key relations (i.e., super-relations) are identified based on the subject matter (e.g., medical, history) covered by the relations being extracted. As described previously, one or more off-the-shelf products or public information sources can be used to identify the key relations for a given subject area. At block 304, example data is obtained for each key relation from a corpus of material. The example data can be obtained by parsing each sentence in the corpus using a parsing tool. At block 306, a subset of the example data is annotated with a label for each key relation, and at block 308, all or a subset of the example data (both labeled and unlabeled) is output as training data.

Once the training data is collected, an embodiment performs relation extraction using manifold models. Given a few labeled examples and many unlabeled examples for a relation, embodiments implement a relation detector that leverages both labeled and unlabeled data. Embodiments described herein follow the manifold regularization idea and implement a strategy to learn a function that assigns a score to each example, or training data instance. Scores are fit so that examples (both labeled and unlabeled) with similar content get similar scores and so that scores of labeled examples are close to their labels. Integration of the unlabeled data can help solve overfitting problems when the labeled data is not sufficient.

Referring to the medical domain example, eight groups of features can be used to represent each relation example. These features include:

(1) Semantic types of argument 1, such as "Antibiotic";
(2) Semantic types of argument 2;
(3) Syntactic features representing the dependency path between two arguments, such as "subj", "pred", "mod_n-prep" and "objprep" (between arguments "antibiotic" and "lyme disease") in the example in FIG. 2;
(4) Features modeling the incoming and outgoing links of both arguments, these features are useful to determine if a relation goes from argument 1 to argument 2 or vice versa;
(5) Topic features modeling the words in the dependency path; in the example given in FIG. 2, the dependency path contains the following words: "be", "standard therapy" and "for"; these features as well as the features in (6) below can be achieved by projecting the words onto a 100 dimensional latent semantic indexing (LSI) topic space constructed from the medical corpus 102;
(6) Topic features modeling the words in the whole sentence;
(7) BOW features modeling the dependency path; in (7) and (8), embodiments can only consider the words that have occurred in the positive training data; and
(8) BOW features modeling the whole sentence.

In relation extraction, many contemporary approaches use non-linear kernels to get the similarity of two relation examples, and in order to classify a relation example using this approach a lot of dot product computations are required. This can be very time consuming and can become a bottleneck in using relation extraction to facilitate clinical decision making. To speed up the classifier during the apply time (e.g., when the clinician is asking a question and waiting for an answer), embodiments disclosed herein use linear classifiers instead of non-linear classifiers.

In an embodiment all features are represented in a single feature space. For example, a vector of 133 entries is utilized (UMLS contains 133 semantic types) to represent the types of argument 1. If argument 1 is associated with two types: "Organic Chemical" and "Antibiotic", then the two corresponding entries can be set to one and all the other entries to zero. Similar approaches can be used to represent the other features.

Figure 4:
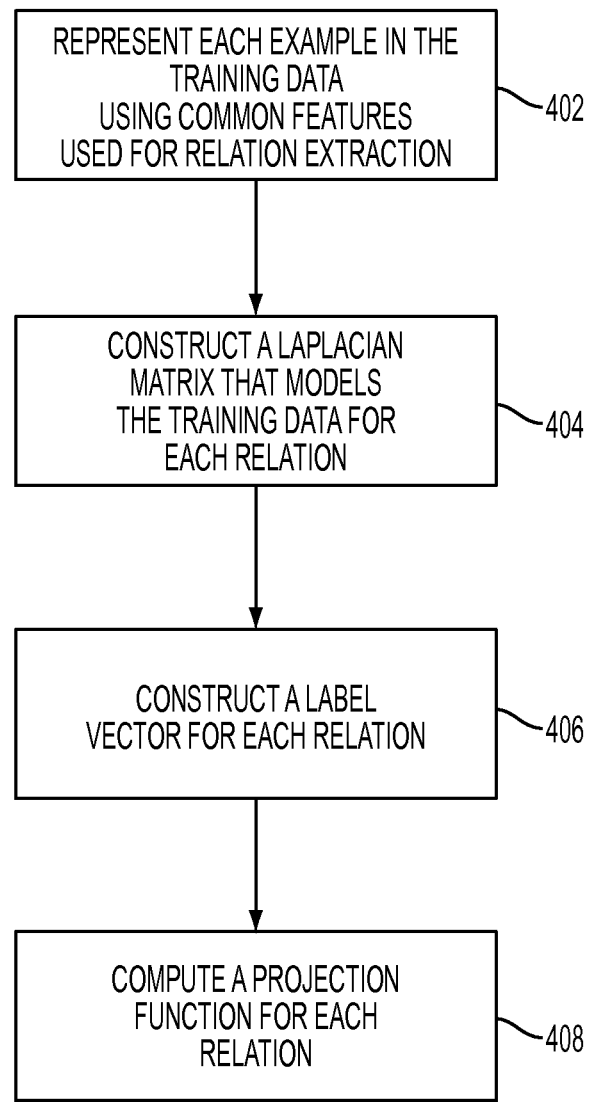
FIG. 4 depicts a process flow for training a model for relation extraction in accordance with an embodiment.

In an embodiment, the processing performed by the classifier to train a model for relation extraction can be formalized as the following mathematical problem to be solved: given a relation dataset $X=\{x_1, \ldots, x_m\}$, and the desired label $Y=\{y_1, \ldots, y_l\}$ for $\{x_1, \ldots, x_l\}$, where $l \le m$, construct a mapping function $f$ to project any example $x_i$ to a new space, where $f^T x_i$ matches $x_i$'s desired label $y_i$. In addition, $f$ needs to preserve the manifold topology of the dataset, such that similar examples (both labeled and unlabeled) get similar scores. Thus, manifold topology preservation implies that the neighbors in the old space are still neighbors in the new space. Here, the label is '+1' for positive examples, and '−1' for negative examples. Notations used herein are shown in the text below, and an algorithm to construct $f$ for each relation is shown in FIG. 4.

Notations:

The input dataset $X=\{x_1, \ldots, x_m\}$ is represented as a feature-instance matrix.

The desired label vector $Y=\{y_1, \ldots, y_l\}$ represents the labels of $\{x_1, \ldots, x_l\}$, where $l \le m$.

W is a weight matrix, where $W_{i,j}=e^{-\|x_i-x_j\|^2}$ models the similarity of $x_i$ and $x_j$.

$\|x_i-x_j\|$ stands for the Euclidean distance between $x_i$ and $x_j$ in the vector space.

$D$ is a diagonal matrix: $D_{i,i}=\Sigma_j W_{i,j}$.

$\mathcal{L}=D^{-0.5}(D-W)D^{-0.5}$ is called normalized graph Laplacian matrix.

$\Delta$ is a user defined $l \times l$ diagonal matrix, where $\Delta_i$ represents the weight of label $y_i$.

$$\mathcal{A} = \begin{pmatrix} \Delta & 0 \\ 0 & 0 \end{pmatrix}$$

is an m×m matrix.

$V=[y_1, \ldots y_l, 0, \ldots, 0]$ is a 1×m matrix.

$\mu$ is a weight scalar.

$()^+$ represents a pseudo inverse.

FIG. 4 depicts a process flow of an algorithm for training a manifold model (e.g., for constructing $f$ for each relation) in accordance with an embodiment. At block 402, each example is represented using features: $X=\{x_i, \ldots, x_m\}$ where $x_i$ is the ith example. A graph Laplacian matrix $\mathcal{L}$ modeling the data manifold is created at block 404, and at block 406 a vector $V=[y_1, \ldots, y_l, 0, \ldots, 0]$ is constructed. At block 408, a projection function, $f=(X(\mathcal{A}+\mu\mathcal{L})X^T)^+ X \mathcal{A} V^T$, is computed for each relation.

A solution to the mathematical problem defined above can be given by the mapping function $f$ to minimize the following cost function:

$$C(f) = \sum_{i \le l} \alpha_i (f^T x_i - y_i)^2 + \mu \sum_{i,j} W_{i,j}(f^T x_i - f^T x_j)^2.$$

The first term of $C(f)$ is based on labeled examples, and penalizes the difference between the mapping result of $x_i$ and its desired label $y_i$. $\alpha_i$ is a user specified parameter, representing the weight of label $y_i$. The second term of $C(f)$ does not take label information into account. It encourages the neighborhood relationship (geometry of the manifold) within X to be preserved in the mapping. When $x_i$ and $x_j$ are similar, the corresponding $W_{i,j}$ is big. If $f$ maps $x_i$ and $x_j$ to different positions, $f$ will be penalized. The second term is useful to bound the mapping function $f$ and prevents overfitting from happening. Here $\mu$ is the weight of the second term. When $\mu=0$, the model disregards the unlabeled data, and the data manifold topology is not respected.

In embodiments, label confidence can be taken into consideration by letting, be the confidence (e.g., a value between 0 and 1). If label will not be taken into account, then $\alpha_i$ can be set to 0. The label confidence can be estimated from the noise rate in the distant supervision data or based on the annotator agreement.

Embodiments do not include the Reproducing Kernel Hilbert Space (RKHS) norm term. Instead, each labeled example is associated with an extra weight for label confidence. This weight is particularly useful when the training data comes from "Crowdsourcing", where multiple workers are asked to complete the same task to correct errors. In that scenario, weights can be assigned to labels based upon annotator agreement.

Theorem 1:

$f=(X(\mathcal{A}+\mu\mathcal{L})X^T)^+ X \mathcal{A} V^T$ minimizes the cost function $C(f)$ Proof:

Given the input X, find the optimal mapping function $f$ such that $C(f)$ is minimized:

$$f = \underset{f}{\mathrm{argmin}}\, C(f).$$

It can be verified that:

$$\sum_{i \le l} \alpha_i (f^T x_i - y_i)^2 = f^T X \mathcal{A} X^T f - 2 f^T X \mathcal{A} V^T + V \mathcal{A} V^T.$$

It can also be verified that:

$$\mu \sum_{i,j} (f^T x_i - f^T x_j)^2 W_{i,j} = \mu f^T X \mathcal{L} X^T f.$$

So $C(f)$ can be written as $$f^T \mathcal{A} X^T f - 2 f^T X \mathcal{A} V^T + V \mathcal{A} V^T + \mu f^T X \mathcal{L} X^T f,$$

Using the Lagrange multiplier technique to differentiate $C(f)$ with respect to $f$ results in:

$$2 X \mathcal{A} X^T f + 2 \mu X \mathcal{L} X^T f = 2 X \mathcal{A} V^T,$$

This implies that:

$$X(\mathcal{A}+\mu\mathcal{L})X^T f = X \mathcal{A} V^T,$$

Therefore:

$$\hat{f} = (X(\circ\mathcal{A} + \mu\mathcal{L})X^T)^+ X \circ\mathcal{A} V^T,$$

where "+" represents pseudo inverse.

Embodiments can also be used to create a relation KB that can be used as a supplement to the UMLS relation KB. The UMLS Metathesaurus contains a large amount of manually extracted relation knowledge and such knowledge is invaluable for use in collecting training data to build new relation detectors. One downside of using this KB is its incompleteness. For example, it only contains the treatments for about 8,000 diseases, which are far from sufficient. Further, the medical knowledge is changing extremely quickly, making timely updates to commercial KBs, such as the UMLS KB difficult.

In an embodiment, relation detectors (trained with all labeled and unlabeled examples) are executed on the medical corpus 102 to extract relations. These results are combined with data from the UMLS KB and stored in a new KB (not shown). The new KB covers all super-relations and can store the knowledge in the format of (relation_name, argument_1, argument_2, confidence), where the confidence is computed based on the relation detector confidence score and relation popularity in the corpus.

Figure 5:
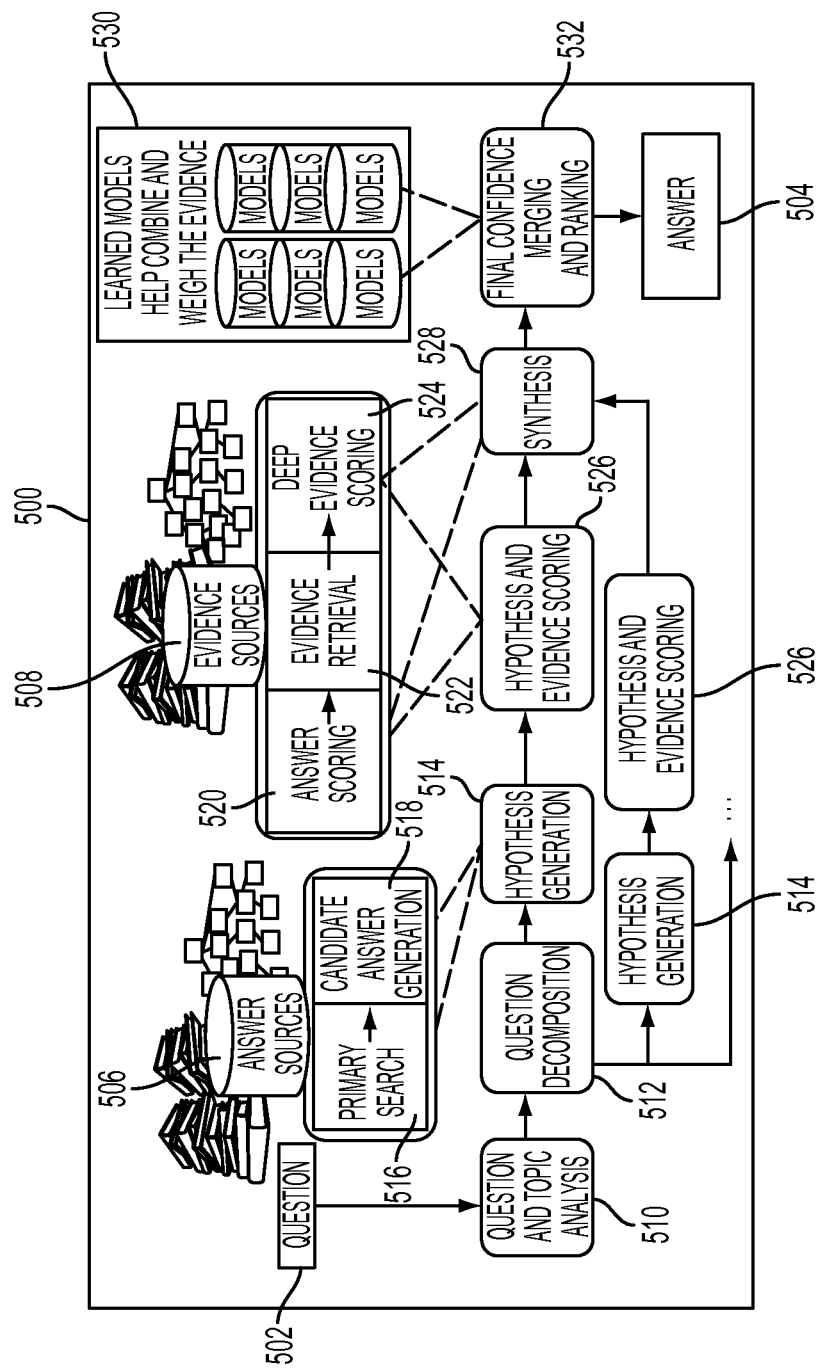
FIG. 5 depicts a high-level block diagram of a question-answer (QA) framework where embodiments of relation extraction can be implemented in accordance with an embodiment.

Turning now to FIG. 5, a high-level block diagram of a question-answer (QA) framework 500 where embodiments described herein can be utilized is generally shown.

The QA framework 500 can be implemented to generate an answer 504 (and a confidence level associated with the answer) to a given question 502. In an embodiment, general principles implemented by the framework 500 to generate answers 504 to questions 502 include massive parallelism, the use of many experts, pervasive confidence estimation, and the integration of shallow and deep knowledge. In an embodiment, the QA framework 500 shown in FIG. 5 is implemented by the Watson™ product from IBM.

The QA framework 500 shown in FIG. 5 defines various stages of analysis in a processing pipeline. In an embodiment, each stage admits multiple implementations that can produce alternative results. At each stage, alternatives can be independently pursued as part of a massively parallel computation. Embodiments of the framework 500 don't assume that any component perfectly understands the question 502 and can just look up the right answer 504 in a database. Rather, many candidate answers can be proposed by searching many different resources, on the basis of different interpretations of the question (e.g., based on a category of the question.) A commitment to any one answer is deferred while more and more evidence is gathered and analyzed for each answer and each alternative path through the system.

As shown in FIG. 5, the question and topic analysis 510 is performed and used in question decomposition 512. Hypotheses are generated by the hypothesis generation block 514 which uses input from the question decomposition 512, as well data obtained via a primary search 516 through the answer sources 506 and candidate answer generation 518 to generate several hypotheses. Hypothesis and evidence scoring 526 is then performed for each hypothesis using evidence sources 508 and can include answer scoring 520, evidence retrieval 522 and deep evidence scoring 524.

A synthesis 528 is performed of the results of the multiple hypothesis and evidence scorings 526. Input to the synthesis 528 can include answer scoring 520, evidence retrieval 522, and deep evidence scoring 524. Learned models 530 can then be applied to the results of the synthesis 528 to generate a final confidence merging and ranking 532. An answer 504 (and a confidence level associated with the answer) is then output.

Relation extraction plays a key role in information extraction in the QA framework 500 shown in FIG. 5. Embodiments of the training data collection and model training disclosed herein can be utilized by the QA framework 500 to improve relation extraction. Examples of where embodiments can be utilized include question and topic analysis 510, where the semantic relations between the question focus and each term in the question can be used to identify the weight of each term so that better search queries can be generated. In addition, in candidate answer generation 518, relations enable the background KB to be used for potential candidate answer generation. Also, in evidence retrieval 622 and deep evidence scoring 624, relation based matching algorithms can be utilized to go beyond explicit lexical and syntactic information in order to detect implicit semantic relations shared across the question and passages.

The framework 500 shown in FIG. 5 can utilize embodiments of the training data collection and the model training described herein to create learned models 530 by training statistical machine learning algorithms on prior sets of questions and answers to learn how best to weight each of the hundreds of features relative to one another. These weights can be used at run time to balance all of the features when combining the final scores for candidate answers to new questions 502. In addition, embodiments can be used to generate a KB based on a corpus of data that replaces or supplements commercially available KBs.

Figure 6:
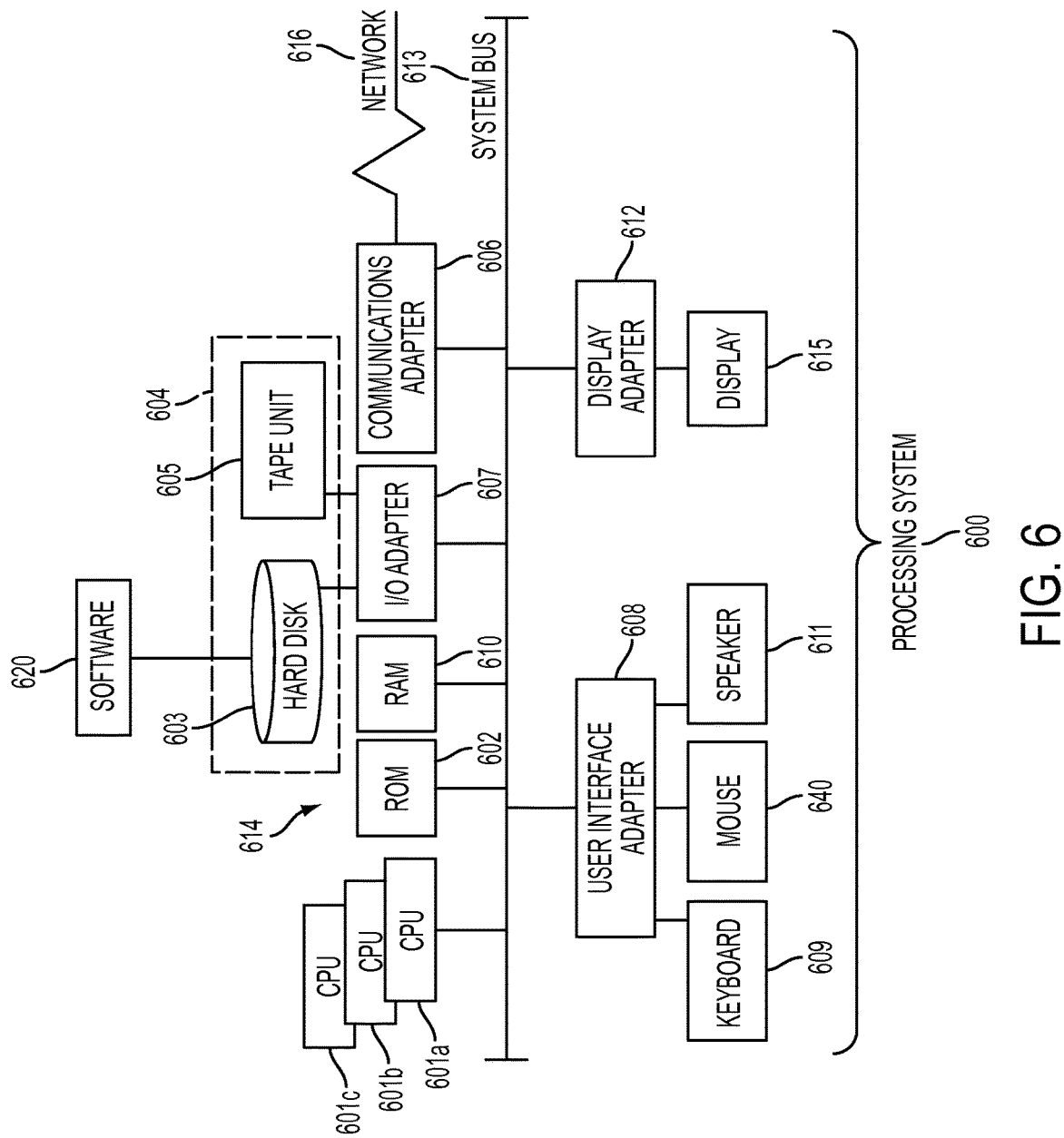
FIG. 6 depicts a processing system for relation extraction in accordance with an embodiment.

Referring now to FIG. 6, there is shown an embodiment of a processing system 600 for implementing the teachings herein. In this embodiment, the processing system 600 has one or more central processing units (processors) 601a, 601b, 601c, etc. (collectively or generically referred to as processor(s) 601). Processors 601 are coupled to system memory 614 and various other components via a system bus 613. Read only memory (ROM) 602 is coupled to system bus 613 and may include a basic input/output system (BIOS), which controls certain basic functions of the processing system 600. The system memory 614 can include ROM 602 and random access memory (RAM) 610, which is read-write memory coupled to system bus 613 for use by processors 601.

FIG. 6 further depicts an input/output (I/O) adapter 607 and a network adapter 606 coupled to the system bus 613. I/O adapter 607 may be a small computer system interface (SCSI) adapter that communicates with a hard disk 603 and/or tape storage drive 605 or any other similar component. I/O adapter 607, hard disk 603, and tape storage drive 605 are collectively referred to herein as mass storage 604. Software 620 for execution on processing system 600 may be stored in mass storage 604. Network adapter 606 interconnects system bus 613 with an outside network 616 enabling processing system 600 to communicate with other such systems. A screen (e.g., a display monitor) 615 is connected to system bus 613 by display adapter 612, which may include a graphics controller to improve the performance of graphics intensive applications and a video controller. In one embodiment, adapters 607, 606, and 612 may be connected to one or more I/O buses that are connected to system bus 613 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 613 via user interface adapter 608 and display adapter 612. A keyboard 609, mouse 640, and speaker 611 can be interconnected to system bus 613 via user interface adapter 608, which may include, for example, a Super I/O chip integrating multiple device adapters into a single integrated circuit.

Thus, as configured in FIG. 6, processing system 600 includes processing capability in the form of processors 601, and, storage capability including system memory 614 and mass storage 604, input means such as keyboard 609 and mouse 640, and output capability including speaker 611 and display 615. In one embodiment, a portion of system memory 614 and mass storage 604 collectively store an operating system such as the AIX® operating system from IBM Corporation to coordinate the functions of the various components shown in FIG. 6.

Technical effects and benefits include the ability to exploit unlabeled data for use in relation extraction, which can help prevent "overfitting" from happening. Embodiments can also provide users with the flexibility to assign different labels with different weight which can be used to provide more accurate results when the training data comes from crowdsourcing or distant supervision. Embodiments can also provide a closed form solution of the result which can be used to produce a more optimal cost function C(f). In addition, embodiments are computationally efficient at the apply time.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    identifying semantic relations to be modeled in a selected domain;
    collecting data from at least one unstructured data source, the collecting based on the identified semantic relations;
    receiving labeled data and unlabeled data both generated from the collected data, the labeled data including labels, generated based on input from a plurality of annotators, that indicate a validity of the identified semantic relations in the labeled data;
    creating training data that includes both the labeled data and the unlabeled data;
    training a manifold model based on the training data and confidence levels associated with the labels in the labeled data, the confidence levels including a first weight that indicates a level of confidence that a label is correct and a second weight that indicates a level of agreement among multiple annotators of the plurality of annotators when correcting a label error;
    applying the manifold model to new data;
    extracting a semantic relation from the new data based on the applying; and
    outputting the sematic relation to a text analytics system.

2. The method of claim 1, wherein the confidence levels are estimated based at least in part on noise rates of the labels.

3. The method of claim 1, wherein the collecting data comprises:
    accessing a knowledge base (KB) of relation knowledge in the selected domain; and
    parsing sentences in the data source using the KB as input.

4. The method of claim 3, wherein the method further comprises supplementing the KB of relation knowledge in the selected domain based on contents of the manifold model.

5. The method of claim 1, wherein training the manifold model comprises:
    representing each instance of the training data using common features used for relation extraction;
    constructing a Laplacian matrix that models the training data for each of the identified semantic relations;
    constructing a label vector for each of the identified semantic relations; and
    computing a projection function for each of the identified semantic relations.

6. The method of claim 1, wherein the manifold model is a closed form solution.

7. The method of claim 1, wherein the selected domain is a medical domain.

8. The method of claim 1, further comprising:
    applying a clustering algorithm to the collected data;
    selecting a subset of the collected data based on results of applying the clustering algorithm; and
    requesting that an annotator create the labeled data from the collected data in the selected subset, wherein the receiving labeled data is responsive to the requesting and the collected data not in the subset is the unlabeled data.

9. The method of claim 1, wherein at least a portion of the labeled data is labeled using distant supervision.

10. The method of claim 1, wherein at least a portion of the records in labeled data is labeled by a plurality of annotators.

11. The method of claim 1, wherein the first weight is expressed as a value between zero and one.

12. The method of claim 1, wherein the first weight is a user specified parameter.

13. The method of claim 1, wherein the multiple annotators are human annotators.

14. A computer program product comprising:
    a tangible storage medium readable by a processing circuit and storing instructions for execution by the processing circuit to perform a method comprising:
    identifying semantic relations to be modeled in a selected domain;
    collecting data from at least one unstructured data source, the collecting based on the identified semantic relations;
    receiving labeled data and unlabeled data both generated from the collected data, the labeled data including labels generated based on input from a plurality of annotators, that indicate a validity of the identified semantic relations in the labeled data;
    creating training data that includes both the labeled data and the unlabeled data;
    training a manifold model based on the training data and confidence levels associated with the labels in the labeled data, the confidence levels including a first weight that indicates a level of confidence that a label is correct and a second weight that indicates a level of agreement among multiple annotators of the plurality of annotators when correcting a label error;

applying the manifold model to new data;

extracting a semantic relation from the new data based on the applying; and outputting the sematic relation to a text analytics system.

15. The computer program product of claim 14, wherein the collecting data comprises:

accessing a knowledge base (KB) of relation knowledge in the selected domain; and parsing sentences in the data source using the KB as input.

16. The computer program product of claim 15, wherein the method further comprises supplementing the KB of relation knowledge in the selected domain based on contents of the manifold model.

17. A system comprising:

a memory having computer readable computer instructions; and a processor for executing the computer readable instructions, the computer readable instructions including:

identifying semantic relations to be modeled in a selected domain;

collecting data from at least one unstructured data source, the collecting based on the identified semantic relations;

receiving labeled data and unlabeled data both generated from the collected data, the labeled data including labels generated based on input from a plurality of annotators, that indicate a validity of the identified semantic relations in the labeled data;

creating training data that includes both the labeled data and the unlabeled data;

training a manifold model based on the training data and confidence levels associated with the labels in the labeled data, the confidence levels including a first weight that indicates a level of confidence that a label is correct and a second weight that indicates a level of agreement among multiple annotators of the plurality of annotators when correcting a label error;

applying the manifold model to new data;

extracting a semantic relation from the new data based on the applying; and outputting the sematic relation to a text analytics system.

18. The system of claim 17, wherein the collecting data comprises:

accessing a knowledge base (KB) of relation knowledge in the selected domain; and parsing sentences in the data source using the KB as input.

19. The system of claim 18, wherein the computer readable instruction further include supplementing the KB of relation knowledge in the selected domain based on contents of the manifold model.

20. The system of claim 17, wherein training the manifold model comprises:

representing each instance of the training data using common features used for relation extraction;

constructing a Laplacian matrix that models the training data for each of the identified semantic relations;

constructing a label vector for each of the identified semantic relations; and computing a projection function for each of the identified semantic relations.

* * * * *